United States Patent
Armstrong et al.

(10) Patent No.: US 10,673,092 B2
(45) Date of Patent: Jun. 2, 2020

(54) FUEL CELL STACK COLUMN INCLUDING STRESS-RELIEF COMPONENTS

(71) Applicant: BLOOM ENERGY CORPORATION, San Jose, CA (US)

(72) Inventors: Tad Armstrong, Burlingame, CA (US); Michael Lesher, Sunnyvale, CA (US); Christopher Lee, San Jose, CA (US)

(73) Assignee: BLOOM ENERGY CORPORATION, San Jose, CA (US)

(*) Notice: Subject to any disclaimer, the term of this patent is extended or adjusted under 35 U.S.C. 154(b) by 0 days.

(21) Appl. No.: 16/245,721

(22) Filed: Jan. 11, 2019

(65) Prior Publication Data
US 2019/0148759 A1   May 16, 2019

Related U.S. Application Data

(62) Division of application No. 15/285,012, filed on Oct. 4, 2016, now Pat. No. 10,211,478.

(60) Provisional application No. 62/238,351, filed on Oct. 7, 2015.

(51) Int. Cl.
| | |
|---|---|
| *H01M 8/2428* | (2016.01) |
| *H01M 8/247* | (2016.01) |
| *H01M 8/248* | (2016.01) |
| *H01M 8/2484* | (2016.01) |
| *H01M 8/021* | (2016.01) |
| *H01M 8/124* | (2016.01) |

(52) U.S. Cl.
CPC ......... *H01M 8/2484* (2016.02); *H01M 8/021* (2013.01); *H01M 8/247* (2013.01); *H01M 8/248* (2013.01); *H01M 8/2428* (2016.02); *H01M 2008/1293* (2013.01)

(58) Field of Classification Search
CPC .... H01M 8/021; H01M 8/2428; H01M 8/247; H01M 8/248; H01M 8/2484; H01M 2008/1293
See application file for complete search history.

(56) References Cited

U.S. PATENT DOCUMENTS

| | | |
|---|---|---|
| 8,563,180 B2 | 10/2013 | Perry et al. |
| 8,785,074 B2 | 7/2014 | Edmonston et al. |
| 8,790,842 B2 | 7/2014 | Schrooten et al. |
| 2003/0031915 A1* | 2/2003 | Diez .................. H01M 8/0271 429/456 |
| 2007/0134524 A1 | 6/2007 | Cho et al. |
| 2007/0196704 A1 | 8/2007 | Valensa et al. |
| 2008/0096085 A1* | 4/2008 | Tsunoda ............. H01M 8/0228 429/457 |
| 2010/0104911 A1 | 4/2010 | Ozaki et al. |
| 2010/0255401 A1* | 10/2010 | Lee ....................... H01M 8/248 429/467 |
| 2014/0272612 A1 | 9/2014 | Trevisan et al. |
| 2017/0104233 A1 | 4/2017 | Armstrong et al. |

FOREIGN PATENT DOCUMENTS

JP       2005-100701       * 4/2005

* cited by examiner

*Primary Examiner* — Anca Eoff
(74) *Attorney, Agent, or Firm* — The Marbury Law Group, PLLC

(57) ABSTRACT

A fuel cell column includes termination plates, fuel cell stacks disposed between the termination plates, and fuel manifolds disposed between the fuel cell stacks. The fuel cell stacks include fuel cells, interconnects disposed between the fuel cells, and end plates disposed on opposing ends of the fuel cell stacks. At least one of the termination plates and/or the fuel manifold may include first and second separate pieces separated by an expansion zone. The fuel cell stack may also include one or more buffer layers and/or seals configured to reduce CTE differences of components of the fuel cell stack.

4 Claims, 12 Drawing Sheets

Prior Art

FUEL CELL STACK COLUMN INCLUDING STRESS-RELIEF COMPONENTS

CROSS-REFERENCE TO RELATED APPLICATIONS

The present application is a divisional of U.S. application Ser. No. 15/285,012, filed Oct. 4, 2016, now U.S. Pat. No. 10,211,478, which claims the benefit of priority of U.S. Provisional Application No. 62/238,351, filed Oct. 7, 2015.

FIELD

Aspects of the present disclosure relate generally to a fuel cell stack column including stress-relief components.

BACKGROUND

U.S. application Ser. No. 11/656,563, filed on Jan. 23, 2007 and published as U.S. published application 2007/0196704 A1 and incorporated herein by reference in its entirety, describes a fuel cell system in which the solid oxide fuel cell (SOFC) stacks are located on a base, as shown in FIG. 1. Wedge shaped ceramic side baffles 220 (e.g., having a non-uniform thickness and a roughly triangular cross sectional shape in the horizontal direction) are located between adjacent fuel cell stacks 14 (or columns of fuel cell stacks). The baffles 220 serve to direct the cathode feed into the cathode flow paths and to fill the space between adjacent stacks so that the cathode feed passes through each of the stacks 14, rather than bypassing around the longitudinal sides of the stacks 14. The baffles 220 are held in place by tie rods 222 that pass through closely fitting bores 224 centrally located in each of the baffles 220. Preferably, the baffles 220 are electrically non-conductive and made as one unitary piece from a suitable ceramic material. FIG. 1 also shows fuel distribution manifolds between the stacks in the stack column and fuel inlet and exhaust conduits connected to the manifolds.

In this prior art system, the SOFC stacks maintain a compressive load. The compressive load is maintained by upper pressure plate 230, tie rods 222, lower pressure plate 90 and a compression spring assembly located below the lower pressure plate 90. The compression spring assembly applies a load directly to the lower pressure plate 90 and to the upper pressure plate 230 via the tie rods 222. The bores or feed-throughs 224 through the baffles 220 act as heat sinks and thereby decrease the system efficiency.

In an alternative embodiment, the load is transmitted through the base 239 as this is the only zero datum of the system. Penetrations or feed-throughs through the base 239 are used in order to pull the required load from the base 239.

SUMMARY

According to various embodiments, provided is a fuel cell stack column comprising: first and second termination plates; and at least one fuel cell stack disposed between the first and second termination plates, wherein at least one of the first and second termination plates comprises first and second pieces separated by an expansion zone.

According to various embodiments, provided is fuel cell stack column comprising: first and second fuel cell stacks; and a fuel manifold comprising a main body disposed between the first and second fuel cell stacks, the main body comprising first and second pieces separated by an expansion zone.

According to various embodiments, provided is a fuel cell stack column comprising: termination plates; fuel cell stacks disposed between the termination plates; a fuel manifold comprising a main body disposed between at least two adjacent fuel cell stacks; and at least one of: a first buffer layer disposed between the fuel manifold and an adjacent fuel cell stack; and a second buffer layer disposed between one of the termination plates and the adjacent fuel cell stack. Each fuel cell stack comprises: fuel cells; interconnects disposed between the fuel cells; and end plates disposed on opposing ends of the fuel cell stack. The coefficient of thermal expansion (CTE) of the first buffer layer is between the CTE of the end plates and the CTE of the fuel manifold, and the CTE of the second buffer layer between the CTE of the end plates and the CTE of the termination plates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION

Figure 1:
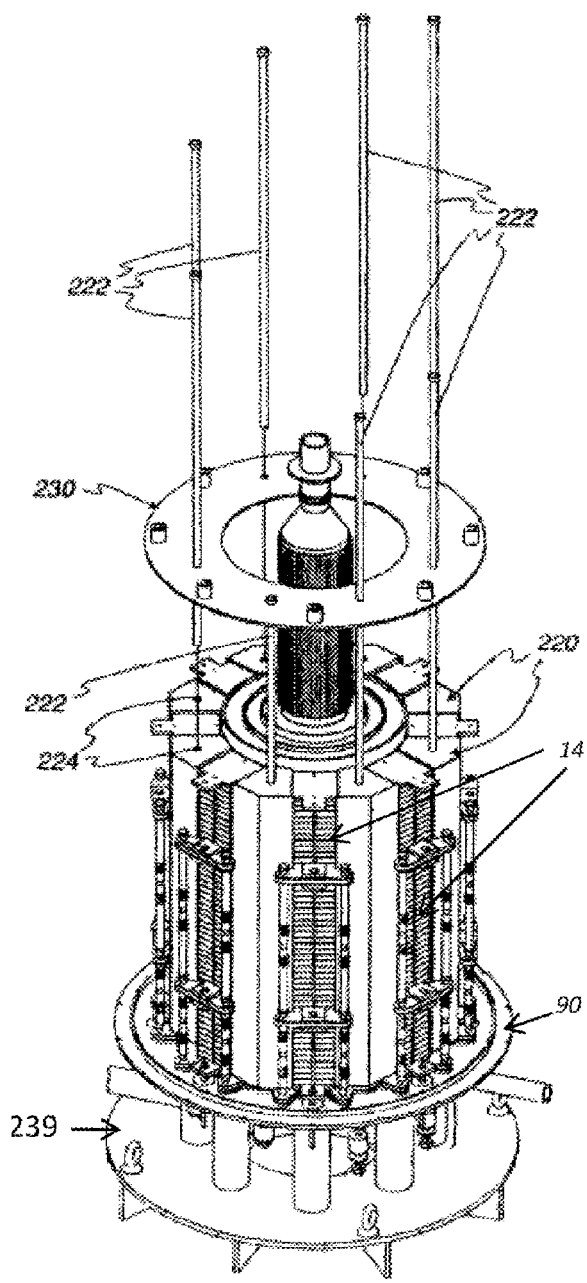
FIG. 1 illustrates a three dimensional view of a conventional fuel cell assembly.

The present disclosure is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

The bores or feed-throughs 224 of the system of FIG. 1 decrease the system efficiency because they create heat sinks. The bores 224 can be eliminated and a compressive load applied to the fuel cell stacks 14 by redesigning the baffles 220. By applying the compressive stress with the baffles themselves, the tie rods 222 can be eliminated, and thus, the bores 224 can be eliminated. Thus, in one embodiment, the baffles lack bore holes that extend vertically through the baffles and tie rods located in the holes.

Figure 2:
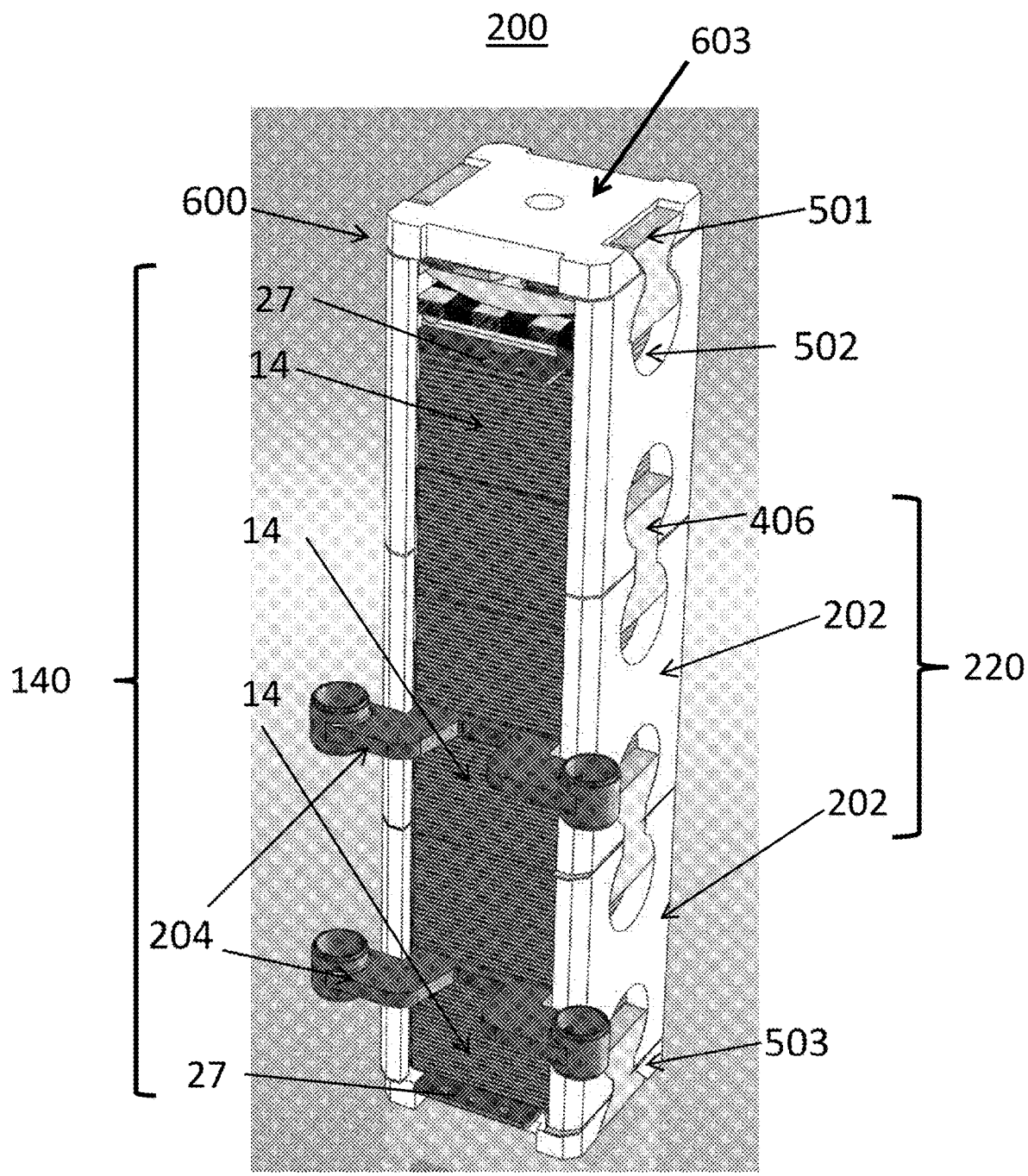
FIG. 2 illustrates a three dimensional view of a fuel cell stack assembly according to an exemplary embodiment of the present disclosure.

FIG. 2 illustrates a fuel cell stack assembly 200 according to various embodiments of the present disclosure. Referring to FIG. 2, the fuel cell stack assembly 200 includes a fuel cell stack column 140, side baffles 220 disposed on opposing sides of the column 140, a lower block 503, and a compression assembly 600 including an upper block 603. The column includes three fuel cell stacks 14, fuel manifolds 204 disposed between the fuel cell stacks 14, and termination plates 27 disposed on opposing ends of the column 140. The fuel cell stacks 14 include a plurality of fuel cells stacked upon one another and separated by interconnects. A plurality of the fuel cell stack assemblies 200 may be attached to a base 239, as shown in FIG. 1.

An exemplary fuel manifold 204 is described in the U.S. application Ser. No. 11/656,563 noted above. Any number of fuel manifolds 204 may be provided between adjacent end plates of adjacent fuel cells of the fuel cell stacks 14, as desired.

The side baffles 220 connect the upper block 603 of the compression assembly 600 and the lower block 503. The side baffles 220, the compression assembly 600, and the lower block 503 may be collectively referred to as a "stack housing". The stack housing is configured to apply a compressive load to the column 140. The configuration of the stack housing eliminates costly feed-throughs and resulting tie rod heat sinks and uses the same part (i.e., side baffle 220) for two purposes: to place the load on the stacks 14 and to direct the cathode feed flow stream (e.g., for a ring shaped arrangement of stacks shown in FIG. 1, the cathode inlet stream, such as air or another oxidizer may be provided from a manifold outside the ring shaped arrangement through the stacks and the exit as a cathode exhaust stream to a manifold located inside the ring shaped arrangement). The side baffles 220 may also electrically isolate the fuel cell stacks 14 from metal components in the system. The load on the column 140 may be provided by the compression assembly 600, which is held in place by the side baffles 220 and the lower block 503. In other words, the compression assembly 600 may bias the stacks 14 of the column 140 towards the lower block 503.

The side baffles 220 are plate-shaped rather than wedge-shaped and include baffle plates 202 and ceramic inserts 406 configured to connect the baffle plates 202. In particular, the baffle plates 202 include generally circular cutouts 502 in which the inserts 406 are disposed. The inserts 406 do not completely fill the cutouts 502. The inserts 406 are generally bowtie-shaped, but include flat edges 501 rather than fully rounded edges. Thus, an empty space remains in the respective cutouts 502 above or below the inserts 406.

The side baffles 220 and baffle plates 202 have two major surfaces and one or more (e.g., four) edge surfaces. One or more of the edge surfaces may have an area at least 5 times smaller than each of the major surfaces. Alternatively, one or more edge surfaces may have an area at least 4 times or 3 times smaller than at least one of the major surfaces. Preferably, the baffle plates 202 have a constant width or thickness, have a substantially rectangular shape when viewed from the side of the major surface, and have a cross sectional shape which is substantially rectangular. In alternative embodiments, the ceramic side baffles 220 are not rectangular, but may have a wedge shaped cross-section. That is, one of the edge surfaces may be wider than the opposing edge surface. However, unlike the prior art baffles, which completely fill the space between adjacent electrode stacks 14, the side baffles 220 of this embodiment are configured so that there is space between side baffles 220. In other words, the side baffles 220 of this embodiment do not completely fill the space between adjacent columns 140. Wedge-shaped metal baffles may be inserted between adjacent side baffles 220, similar to the configuration shown in FIG. 1.

Generally, the side baffles 220 are made from a high-temperature tolerant material, such as alumina or other suitable ceramic. In various embodiments, the side baffles 220 are made from a ceramic matrix composite (CMC). The CMC may include, for example, a matrix of aluminum oxide (e.g., alumina), zirconium oxide or silicon carbide. Other matrix materials may be selected as well. The fibers may be made from alumina, carbon, silicon carbide, or any other suitable material. The lower block 503 and the compression assembly 600 may also be made of the same or similar materials. The selection of particular materials for the compression housing is discussed in detail, below.

Any combination of the matrix and fibers may be used. Additionally, the fibers may be coated with an interfacial layer designed to improve the fatigue properties of the CMC. If desired, the CMC baffles may be made from a unitary piece of CMC material rather than from individual interlocking baffle plates. The CMC material may increase the baffle strength and creep resistance. If the baffles are made from alumina or an alumina fiber/alumina matrix CMC, then this material is a relatively good thermal conductor at typical SOFC operating temperatures (e.g., above 700° C.). If thermal decoupling of neighboring stacks or columns is desired, then the baffles can be made of a thermally insulating ceramic or CMC material.

Other elements of the compression housing, such as the lower block 503 and the compression assembly 600 may also be made of the same or similar materials. For example, the lower block 503 may comprise a ceramic material, such as alumina or CMC, which is separately attached (e.g., by the inserts, dovetails or other implements) to the side baffles 220 and to a system base 239. The use of the ceramic block material minimizes creation of heat sinks and eliminates the problem of linking the ceramic baffles to a metal base, which introduces thermal expansion interface problems. The selection of particular materials for the components of the compression housing is discussed in detail, below.

Figure 3:
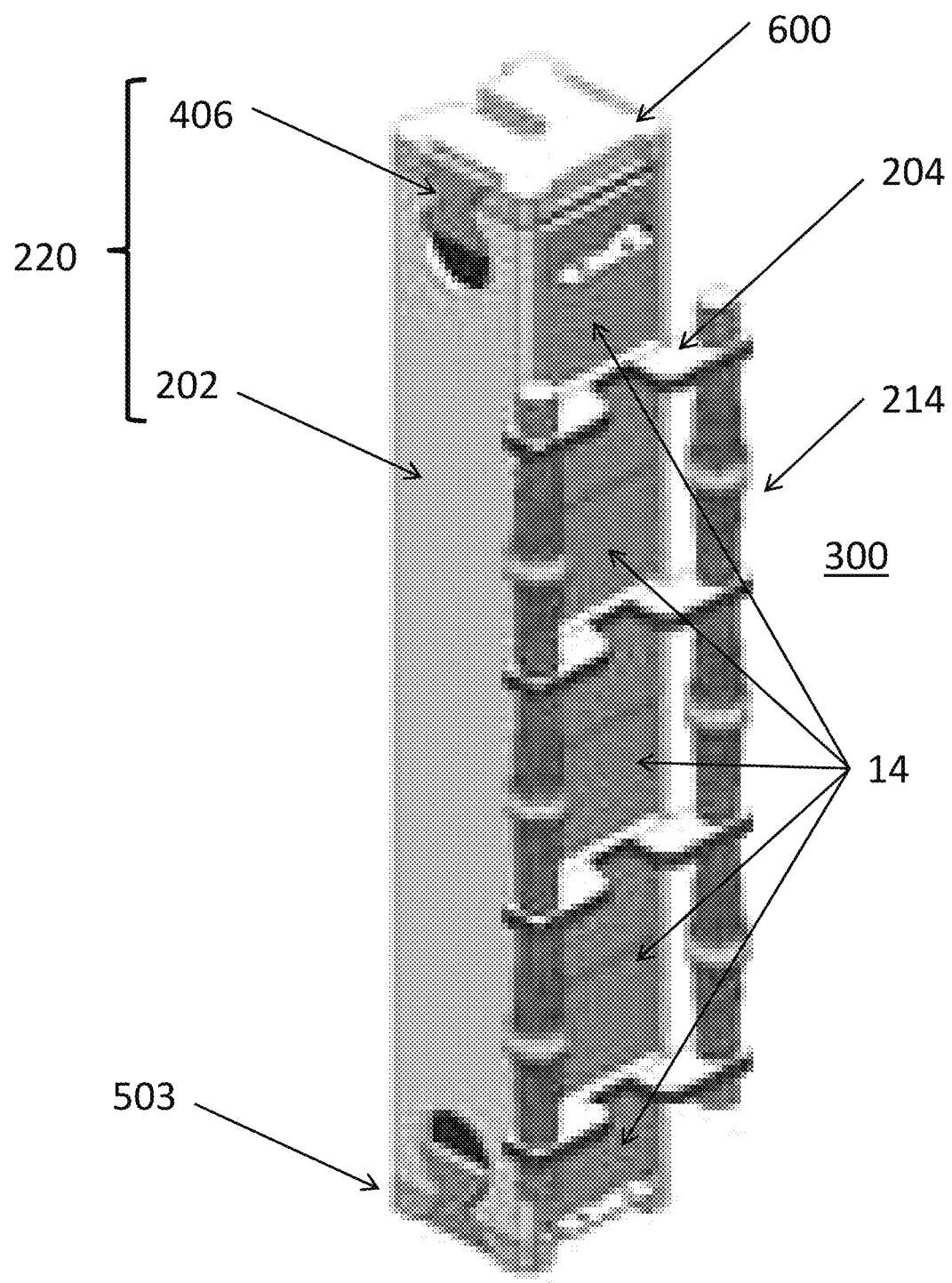
FIG. 3 illustrates a three dimensional view of a fuel cell stack assembly according to an exemplary embodiment of the present disclosure.

FIG. 3 illustrates a fuel cell stack assembly 300 according to various embodiments of the present disclosure. The fuel cell stack assembly 300 is similar to the fuel cell stack assembly 200, so only the differences therebetween will be discussed in detail. Similar elements have the same reference numbers. Fuel rails 214 (e.g. fuel inlet and outlet pipes or conduits) connect to fuel manifolds 204 located between the stacks 14 in the column.

Referring to FIG. 3, the fuel cell stack assembly 300 includes side baffles 220 disposed on opposing sides of the column of fuel cell stacks 14. However, each of the side baffles 220 includes only a single baffle plate 202, rather than the multiple baffle plates 202 of the fuel cell stack assembly 200. In addition, the side baffles 220 include ceramic inserts 406 to connect the baffle plates 202 to a compression assembly 600 and a lower block 503.

Figure 4:
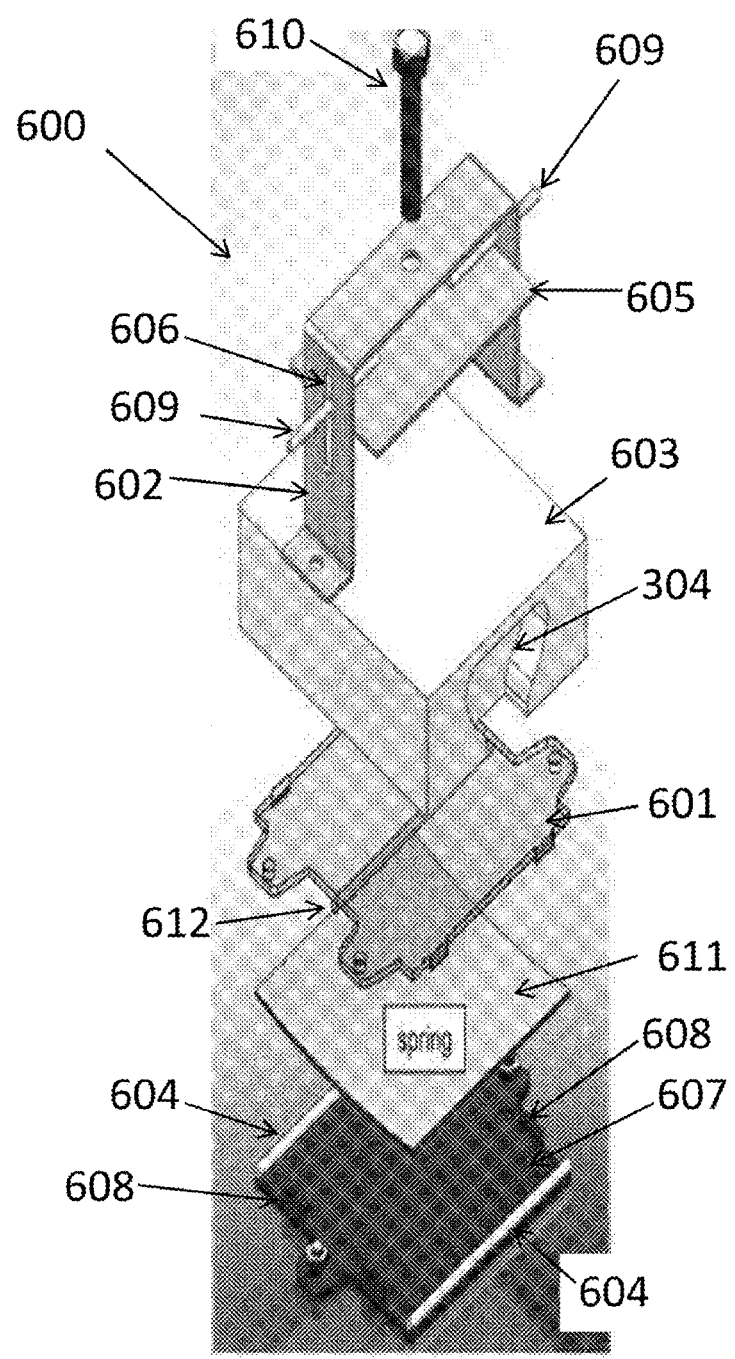
FIG. 4 illustrates an exploded view of a compression assembly according to an exemplary embodiment of the present disclosure.

FIG. 4 illustrates an embodiment of a compression assembly 600 that may be used in conjunction with any of the embodiments described above. Referring to FIG. 4, the compression assembly 600 may be used to apply a compressive load to the column of fuel cell stacks 14. The compression assembly 600 includes a spring 611. As illustrated, spring 611 is a ceramic (e.g., CMC or alumina) leaf spring. A CMC spring is advantageous because it may include creep resistant fibers arranged in a direction in the matrix which resists creep. The ceramic spring can exist in a high temperature zone and allow for travel from differential thermal expansion from components applying the load to the stack. However, any other type of spring or combination of springs may be used. For example, the spring 611 may be a coil spring, a torsion spring, or a volute spring.

The compression assembly 600 may include a rod plate 607 configured to provide a resilient surface against which the spring 611 can generate a compressive load. Preferably, the rod plate 607 includes retention barriers 608 configured to prevent the spring 611 from sliding off the rod plate 607. When using a leaf spring, the rod plate 607 may also include spring support rods 604. In this configuration, the spring 611 may be placed on top of the spring support rods 604 in an unstressed condition (see also FIG. 5).

An upper plate 601 is provided on top of the spring 611, that is, on the opposite side of the spring 611 from the rod plate 607. The upper plate 601 may include a spring tensioner 612, in this embodiment a rod, on the bottom of the upper plate 601. The spring tensioner 612 is preferably located approximately in the center of the upper plate 601. The compression assembly 600 may also be provided with an upper block 603 which may include either cutouts 304 (which accept inserts 406 from baffles as illustrated) or protrusions 303 by which compression assembly 600 may be attached to the side baffles 220.

A temporary tightening mechanism may be attached over or to the compression assembly 600 during the process of connecting the assembly to the baffles 220. In the embodiment of FIG. 4, this mechanism includes a bracket 602. The bracket 602 may be affixed to the rod plate 607 by bolts as illustrated or by any other suitable mechanism. Movably attached to the bracket 602 is a temporary tensioner which in this embodiment comprises a pressure plate 605. As illustrated, the pressure plate 605 is movably attached to the bracket 602 by way of rods 609 which slide in elongated slots 606.

The compression load applied by the compression assembly 600 may be adjusted via a pressure adjusting mechanism 610. The pressure adjusting mechanism 610 may be, for example, a screw or bolt which may be raised or lowered by rotating. In the embodiment illustrated in FIG. 4, lowering the pressure adjusting mechanism 606 causes the pressure plate 605 to travel downward. As the pressure plate 605 lowers, it forces the upper block 603 and the upper plate 601 to lower as well. When the upper plate 601 lowers, the spring tensioner 612 is forced against the center of the spring 611, causing it to bend and thereby apply a load to the spring 611.

In use, the pressure adjusting mechanism 610 is lowered (and the spring 611 compressed) until the upper block 603 can be connected (e.g., hooked) to the side baffles 220. Once the side baffles 220 are connected via dovetails, inserts or other implements, the pressure adjusting mechanism 610 is loosened to release the bracket 602. The force of the spring 611, previously "held" by the pressure adjusting mechanism 610, is now transferred to the side baffles 220. Adjustment of the compressive force on the stack may be attained by fitting shims (not shown) between the compression assembly 600 and the top of the column of stacks 14 (which sits below the rod plate 607 of the compression assembly 600). More shims create a tighter compression. The pressure adjusting mechanism 610 provides pretension to allow connection of the compression assembly 600 to the side baffles 220. The bracket 602, including mechanism 610 and elements 605, 606 and 609 are then removed from the fuel cell column before the column is placed into an operating mode.

Figure 5:
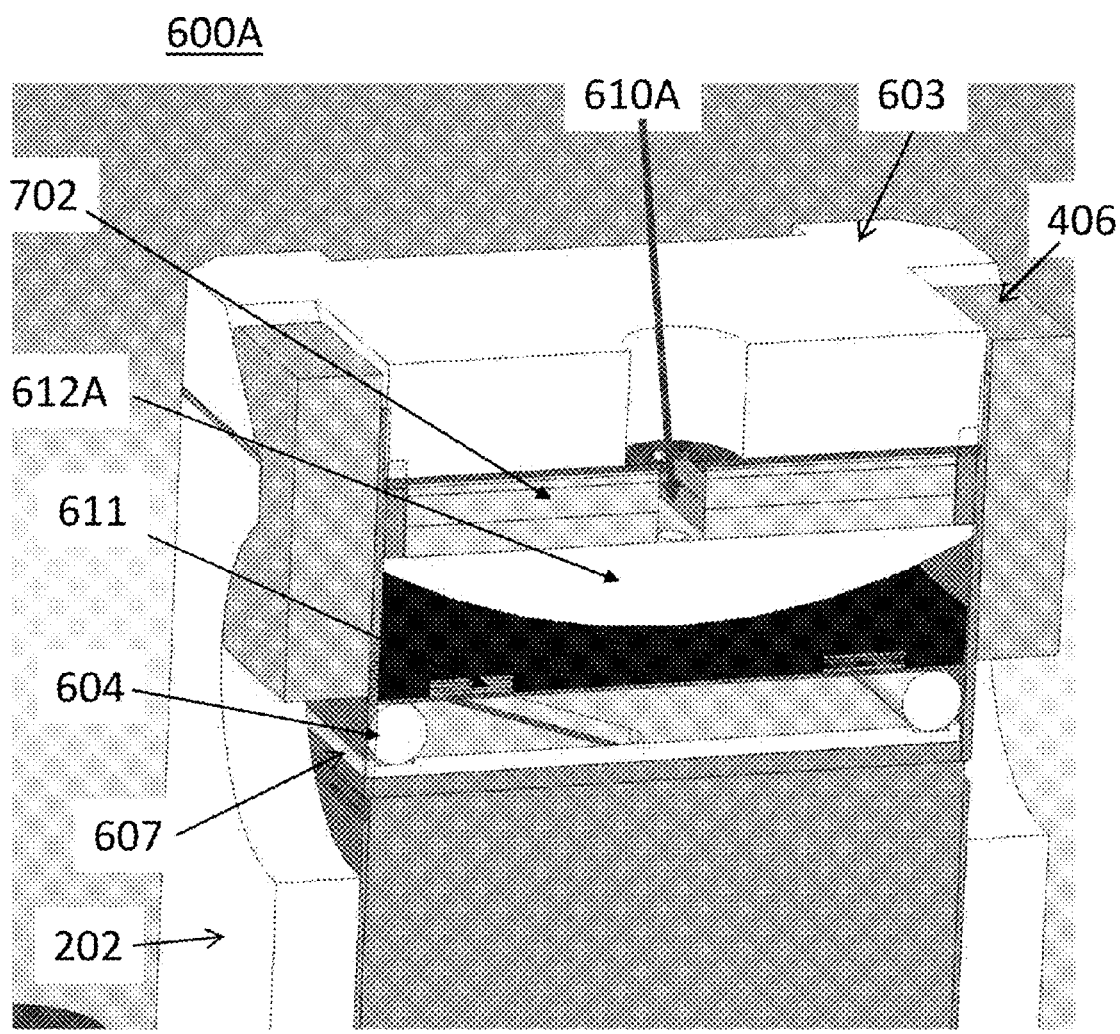
FIG. 5 illustrates a cross-sectional view of a compression assembly according to an exemplary embodiment of the present disclosure.

FIG. 5 illustrates another embodiment of a compression assembly 600A. This embodiment is similar to the previous embodiment. However, the rod shaped spring tensioner 612 is replaced with a dome shaped spring tensioner 612A, where the curved side of the dome is in contact with the upper surface of the spring. Spring support rods 604 contact edge portions of a lower surface of the spring 611 to induce bending in the spring. Additionally, this embodiment includes spacers 702 which reduces the distance between the block 603 and the spring 611, thereby reducing the amount of adjustment required with the temporary tightening mechanism, such as a bolt or screw (not shown for clarity) to apply a load to the spring 611 through opening 610A.

Figures 6A, 6B:
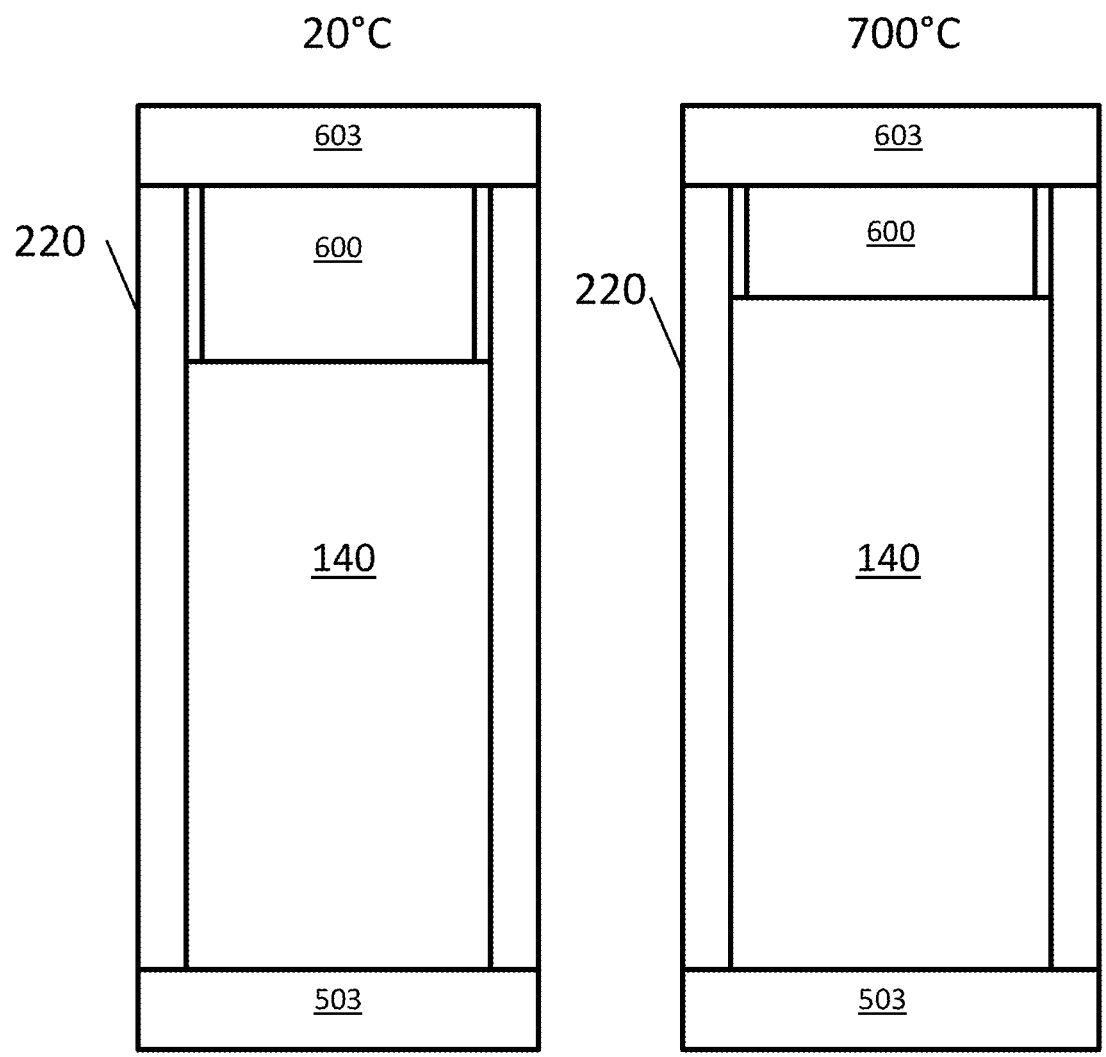
FIGS. 6A and 6B are schematic front views of a fuel cell stack assembly at 20° C. and 700° C., respectively.

FIGS. 6A and 6B illustrate are schematic views of a fuel cell stack assembly, which may be any of the above-described fuel cell stack assemblies 200, 300, or another type of fuel cell stack assembly, at 20° C. and 700° C., respectively. Referring to FIGS. 6A and 6B, the coefficient of thermal expansion (CTE) of the column 140 of fuel cell stacks may be different from the CTE of the side baffles 220. For example, the CTE of the column 140 may be about 9.7, at room temperature. The CTE of the side baffles 220 may about 7.2 at room temperature, if the side baffles 220 are formed of about 99 wt % alumina. Accordingly, as shown in FIGS. 6A and 6B, as the fuel cell stack assembly is heated, the column 140 expands faster than the side baffles, resulting in increased deflection of the compression assembly 600. As such, the load applied to the column 140 is increased. Although compression assembly 600 is shown, any other suitable compression assemblies may be used.

It is also important to note that the spring constant of the compression assembly may be highly non-linear. Further, since the compression assembly is already deflected at 20° C., the additional deflection at 700° C. may apply a substantially higher load to the column 140. Based on modeling, it is calculated that an original load of 350 lbs at room temperature can exceed 1000 lbs, when the column 140 heats up to 650° C. (before the interface seals melt). The opposite scenario is also true, in that the load on the column 140 will be reduced significantly, if the column 140 is cooled from a high temperature. The fundamental reason for this difference is the CTE difference between the column 140 and the side baffles. The increased loading at high temperatures may result in damage to the fuel cell stacks of the column 140 and/or other components of the fuel cell stack assembly.

In order to overcome or reduce the above and/or other problems, the side baffles 220 of the above embodiments may be configured to have a CTE that is substantially the same (within about +/−20%, such as +/−10%) as the CTE of the column 140. According to some embodiments, the CTE of the baffle plates 202 may be within about +/−5% of the CTE of the column 140. The CTE of the side baffles may be altered by altering the composition of one or more components of the side baffles 220. Herein, the CTE of an element refers to a CTE of the element at room temperature.

For example, when the side baffles each include a single baffle plate 202, as shown in the embodiment of FIG. 3, the baffle plates 202 can be formed of a material having a CTE that is similar to the CTE of the column 140. In particular, the CTE of the baffle plates 202 may be within about +/−20%, such as +/−10% of the CTE of the fuel cell stack. The CTE of the baffle plates 202 may be controlled by doping or mixing alumina with other ceramic components, or by choosing different material sets. The following Table 1 includes exemplary ceramic materials that may be included in the side baffles and corresponding CTE's. However, the present disclosure is not limited to such materials, as other suitable materials may be used.

TABLE 1

| Material | CTE (Room Temperature) |
| --- | --- |
| Alumina | 7.2 |
| Zirconia (Tetragonal) | 12 |
| Magnesia | 13.5 |
| Alumina-Titania Mixture | 9.7 |
| Zirconia-Magnesia Mixture | 12 |

As shown in Table 1, an alumina-titania mixture may be prepared to have a CTE of 9.7, which is substantially the same as the CTE of a column of fuel cell stacks. As such, a side baffle 220 including an alumina-titania mixture expands at substantially the same rate as the column 140, which prevents excessive loading of the column 140 during heating.

Further, zirconia (tetragonal phase), magnesia, and a zirconia-magnesia mixture exhibit CTE's that are slightly higher than 9.7. As such, side baffles 220 including these materials could also prevent excessive loading of the column 140 during heating. While these materials would expand at a higher rate than the column 140, such a difference can be compensated for by a compression assembly, since the spring constant of the compression assembly 600 may be more linear at lower levels of compression. Side baffles 220 can include a mixture of alumina and magnesia, or a mixture of alumina and zirconia, with amount ratios of the mixtures configured such that the side baffles 220 and the column 140 have substantially the same CTE.

The baffle plates 202 and the ceramic inserts 406 of the side baffles 220 may be formed of the same material. However, according to some embodiments, the baffle plates 202 and the ceramic inserts 406 may be formed of different materials that have CTE's that are higher or lower than the CTE of the column 140, so long as the total CTE of the side baffles 220 is similar to the CTE of the column 140.

Figure 7:
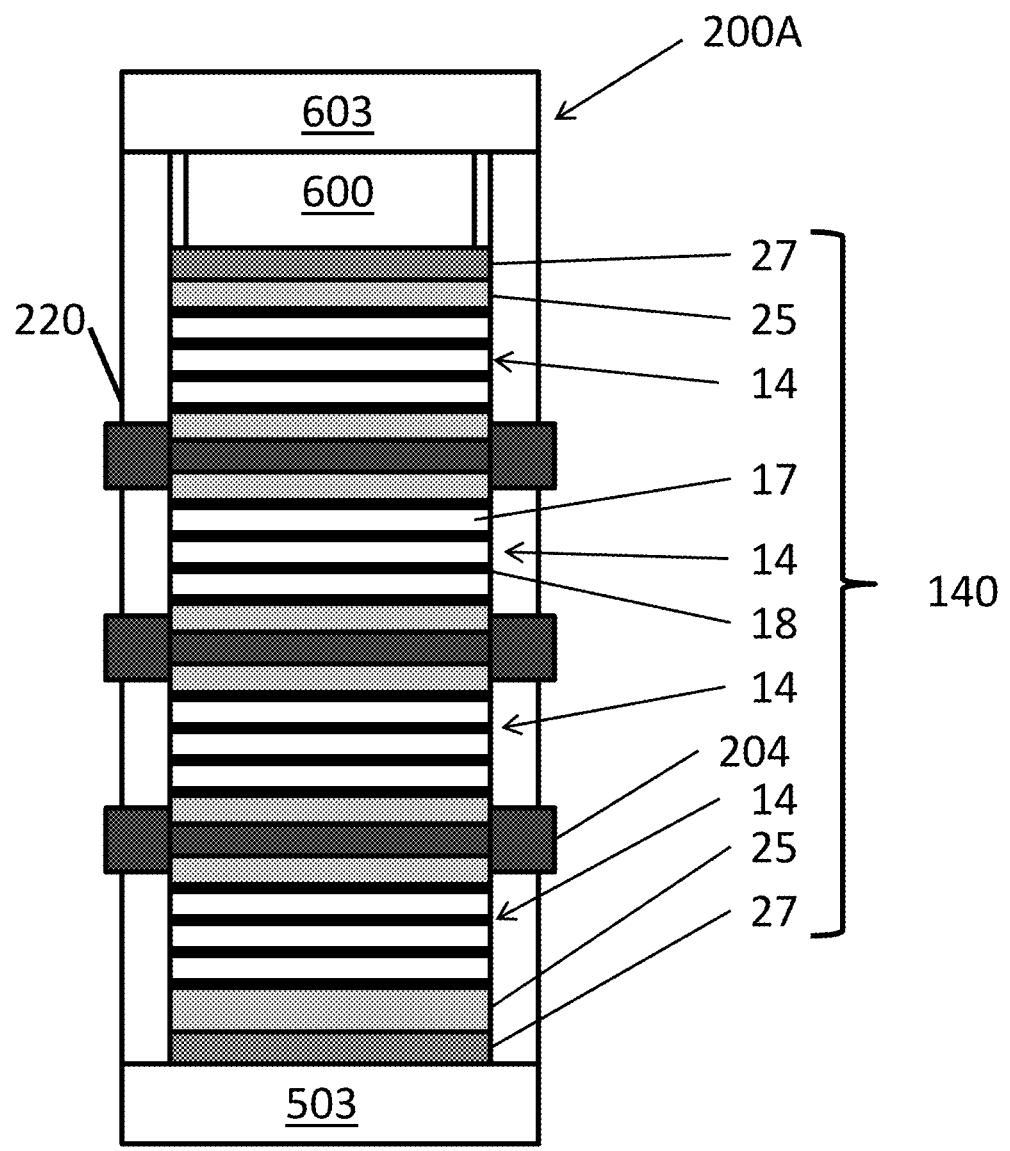
FIG. 7 is a schematic front view of a fuel cell stack assembly, according to various embodiments of the present disclosure.

FIG. 7 is a schematic view of a fuel cell stack assembly 200A, according to various embodiments of the present disclosure. The assembly 200A may be similar to the assembly 200 or 300 described above. Referring to FIG. 7, the fuel cell stack assembly 200A includes side baffles 220, an upper block 603, a compression assembly 600, a lower block 503, and a fuel cell stack column 140. The column 140 includes fuel cell stacks 14 that may include stacked fuel cells 18, interconnects 17 separating the fuel cells 18, fuel manifolds 204 (anode splitter plates), end plates 25, and termination plates 27. The termination plates 27 may be disposed at opposing ends of the column 140. The fuel cells 18 may be solid oxide fuel cells. The end plates 25 may be disposed on opposing ends of the fuel cell stacks 14. The end plates 25 may be disposed between the termination plates 27 and the adjacent fuel cells 18 at opposing ends of the column 140. The fuel manifolds 204 may be disposed between the fuel cell stacks 14.

According to some embodiments, the interconnects 17 and the end plates 25 may be made of a Cr—Fe alloy with a CTE of about 9.7 ppm/° C. For example, the chromium-iron alloy may include, by weight, from about 94 to about 95%, such as about 95% Cr, and from about 4 to about 6%, such as about 5% Fe. The termination plates 27 and the fuel manifolds 204 may be made of a ferritic stainless steel having a CTE between about 10.4 and 12.1 ppm/° C. For example, the ferritic stainless steel may be SS 446, which may include, by weight, 23.0%-27.0% Cr, 1.5% Mn, 1.0% Si, 0.25% Ni, 0.20% Ni, 0.20% C, 0.04% P, and 0.03% S and balance Fe (e.g., 73% Fe).

The present inventors determined that there is a high propensity for the fuel cells 18 at ends of the stacks 14 to develop cracks after thermal cycling. However, the present inventors further determined that if the termination plates 27 are formed by powder metallurgy using the Cr—Fe alloy with a nearly identical CTE as the end plates 25, rather than stainless steel, the likelihood of cracking the end fuel cells 18 is decreased significantly. Without wishing to be bound to a particular theory, the present inventors believe that the CTE mismatch between the end plates 25 and the fuel manifolds 204 or termination plates 27 may result in fuel cell cracking during thermal cycling. In response, the termination plates 27 and the fuel manifolds 204 of the following embodiments have been configured to reduce the stresses resulting from the thermal expansion differences described above.

Figure 8A:
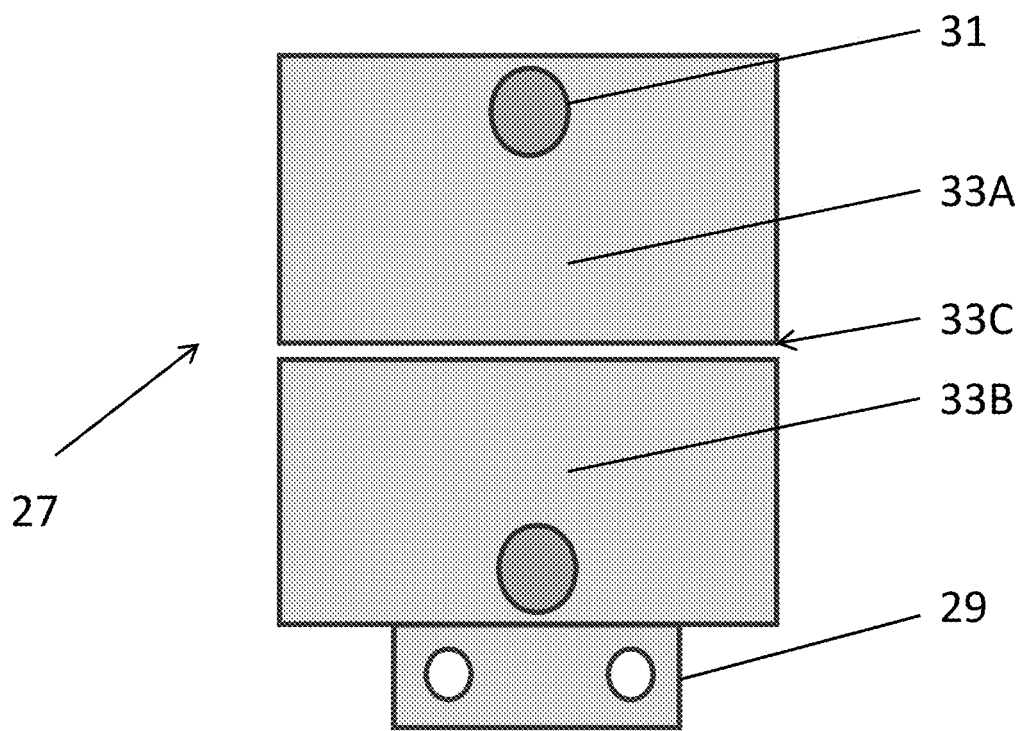
FIG. 8A is a top plan view of a modified termination plate according to various embodiments of the present disclosure.
Figure 8B:
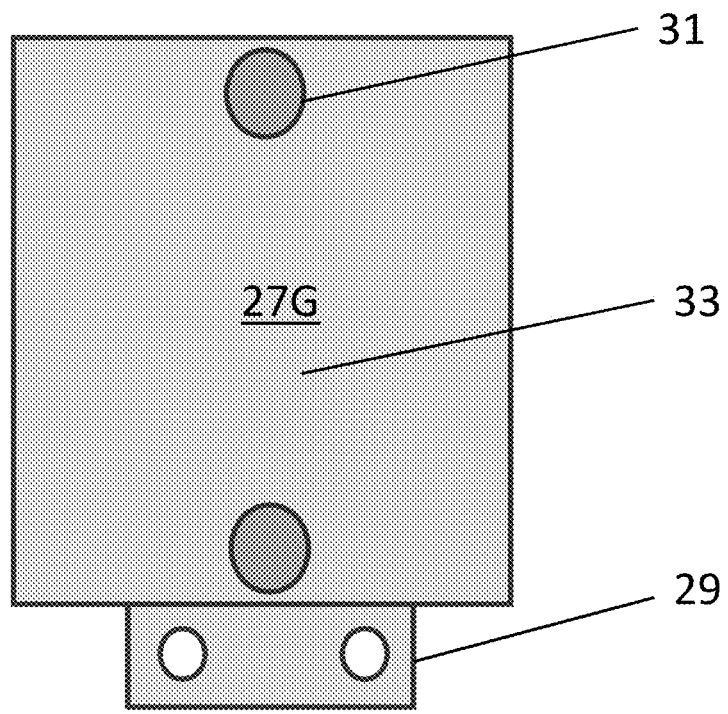
FIG. 8B is a top plan view of a general termination plate.

FIG. 8A is a plan view of a modified termination plate 27 according to various embodiments of the present disclosure, and FIG. 8B is a plan view of a general termination plate 27G of a comparative example. Referring to FIGS. 8A and 8B, the termination plates 27, 27G include terminals 29 configured to electrically connect a fuel cell stack to a power conditioning module using attached electrical wires, jumpers, or other suitable electrical connectors, and sealing surfaces 31 configured to seal fuel riser openings of adjacent end plates 25. The general termination plate 27G includes a single main body 33.

In contrast, the modified termination plate 27 includes a main body divided into first and second separate pieces 33A, 33B. According to some embodiments, the first and second pieces 33A, 33B may be separated by an expansion zone 33C, which is similar to the expansion zone 221C described below. Each piece 33A, 33B includes a fuel riser opening sealing surface 31, which may be configured to seal the fuel riser opening of an adjacent stack component (e.g., of adjacent end plates). The terminal 29 is shown as being connected the second piece 33B. However, the terminal 29 may be connected to the first piece 33A in some embodiments.

With this design, the sealing surfaces 31 of each piece 33A, 33B are free to float with respect to each other, due to the segmentation of the main body. This design also allows for the relative displacement of the termination plate pieces 33A, 33B when coupled to an end plate having a different CTE, and for the relative displacement of the sealing surfaces 31, thereby reducing stresses applied to adjacent fuel cells and reducing fuel cell cracking during thermal cycling.

Figure 9:
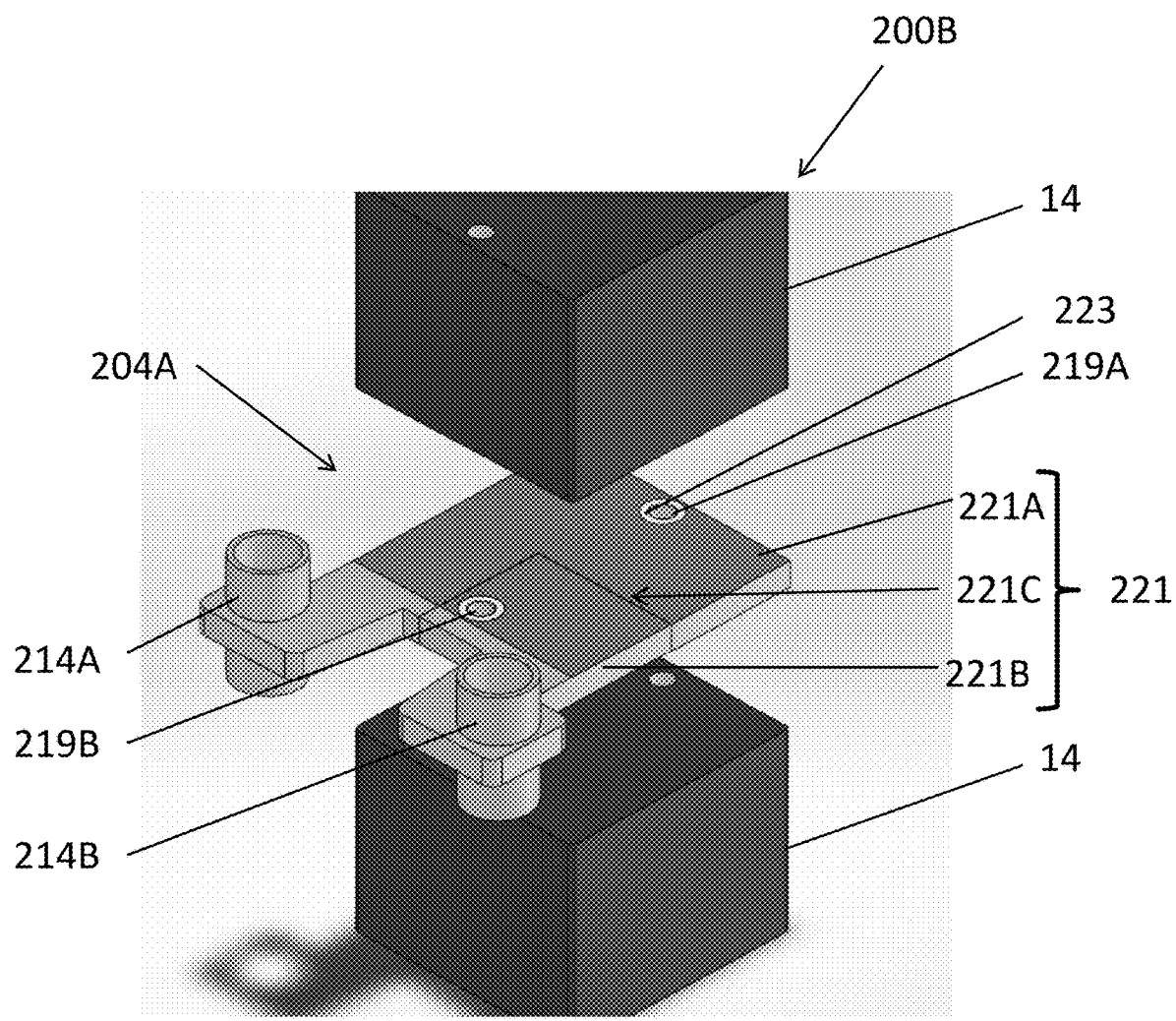
FIG. 9 is an exploded perspective view of a portion of a fuel cell stack assembly, according to various embodiments of the present disclosure.

FIG. 9 is an exploded perspective view of a portion of a fuel cell stack assembly 200B, according to various embodiments of the present disclosure. The fuel cell stack assembly 200B is similar to the fuel cell stack assembly 200A, so only the differences therebetween will be discussed in detail.

Referring to FIG. 9, the fuel cell stack assembly 200B includes fuel cell stacks 14 and a fuel manifold 204A. The fuel manifold 204A includes first and second fuel conduits 214A, 214B (e.g., rail shaped pipes), first and second fuel holes (i.e., fuel riser openings through the manifold) 219A, 219B, fuel hole seals 223, and a main body 221 including first and second separate pieces 221A, 221B. According to some embodiments, the first and second pieces 221A, 221B may be separated by an expansion zone 221C. The expansion zone may be an empty space between pieces 221A and 221B, a sealing material filled space or the interface where the sidewalls of the first and second pieces contact each other. If the sidewalls of the pieces contact each other, there is preferably not connection between the pieces across the expansion zone 221C to allow the pieces to "float" independent of each other. The first fuel conduit 214A is connected to the first fuel hole 219A through the first piece 221A. The second fuel conduit 214B is connected to the second fuel hole 219B through the second piece 221B. In operation, fuel may flow from the first conduit 214A (e.g., fuel inlet conduit), through the first piece 221A, and then out of the first fuel hole 219A. The fuel may be circulated in the stacks 14 before becoming a fuel exhaust which enters the second fuel hole 219B, flowing through the second piece 221B, and then into the second conduit 214B (e.g., the fuel exhaust conduit). In particular, the first and second pieces 221A, 221B may be hollow or may include conduits connecting the respective conduits 214A, 214B and the fuel holes 219A, 219B. According to other embodiments, the fuel may flow in the opposite direction through the fuel cell stack assembly 200B (i.e., where conduit 214B is the fuel inlet conduit and conduit 214A is the fuel exhaust conduit).

The segmentation of the main body 221 allows the first and second pieces 221A, 221B to float relative to one another. Accordingly, stresses applied to adjacent fuel cell stack components, such as end plates and fuel cells, may be reduced during thermal cycling. While the fuel manifold 204A is shown to include an L-shaped first piece 221A and a generally rectangular second piece 221B, the present disclosure is not limited thereto. In particular, the pieces 221A, 221B may have other configurations, so long as each fuel hole and is connected to a fuel riser conduit or channel through a respective piece of the main body. According to some embodiments, the assembly 200B may include the termination plate 27 of FIG. 8A, or the termination plate 27G of FIG. 8B.

Figure 10:
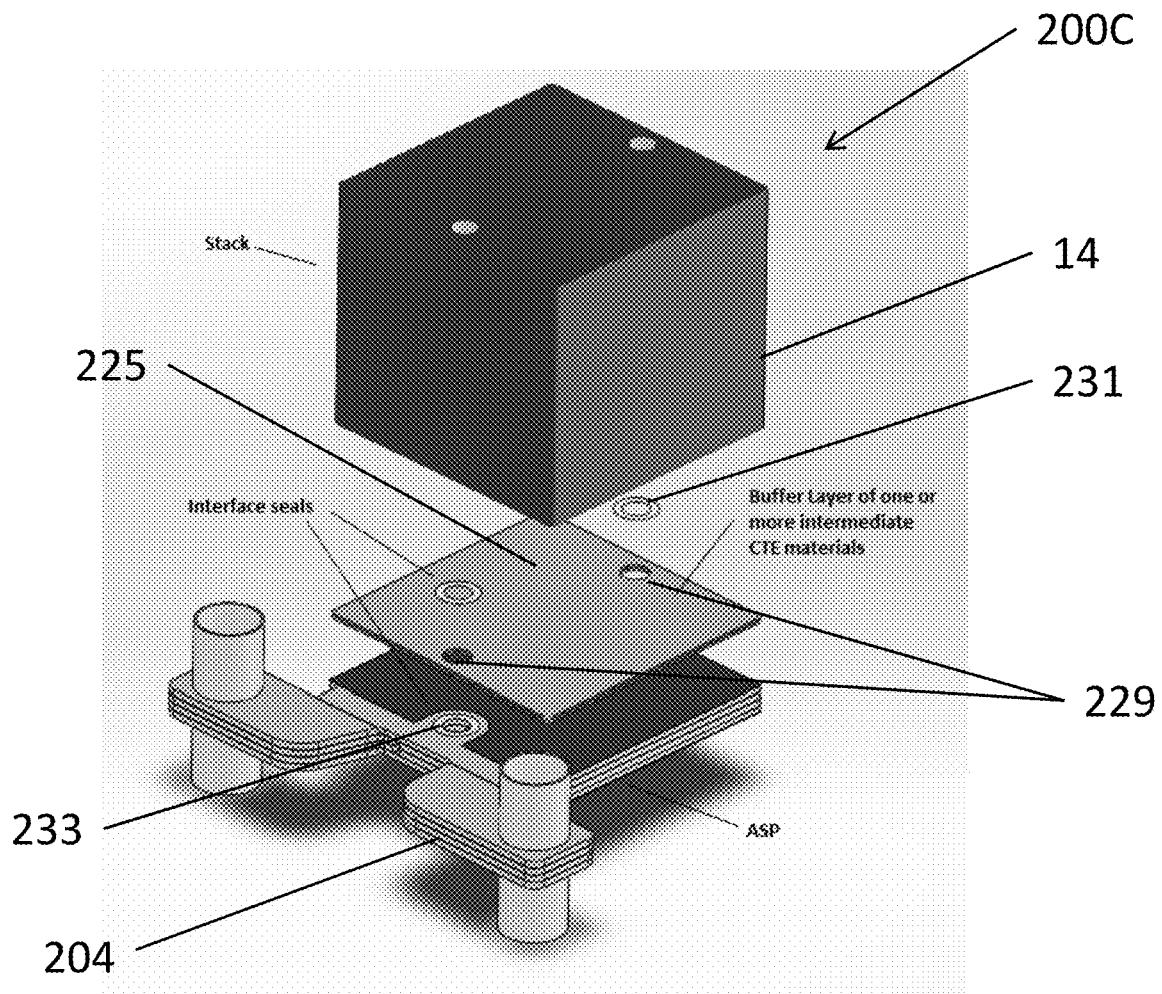
FIG. 10 is an exploded perspective view of a fuel cell stack assembly, according to various embodiments of the present disclosure.

FIG. 10 is an exploded perspective view of a fuel cell stack assembly 200C, according to various embodiments of the present disclosure. The fuel cell stack assembly 200C is similar to the fuel cell stack assembly 200A, so only the differences therebetween will be discussed in detail.

Referring to FIG. 10, the fuel cell stack assembly 200C includes a fuel cell stack 14, a fuel manifold 204, a buffer layer 225 including fuel riser openings 229 (e.g., inlet and outlet openings), first seals 231 and second seals 233. The buffer layer 225 includes a material having a CTE between that of the fuel manifold 204 an adjacent component of the stack 14, such as an end plate 25 (e.g., Cr—Fe alloy plate). In some embodiments, buffer layers 225 may be disposed between any components of the stack that have a CTE mismatch, as discussed below with reference to FIG. 11.

The first seals 231 may be disposed between the buffer layer 225 and the stack 14 and may operate to seal the riser openings 229. The first seals 231 may include a glassy (e.g., glass) material. The second seals 233 may be disposed between the buffer layer 225 and the fuel manifold 204 and may operate to seal the riser openings 229 and the fuel holes 219A and 219B in the manifold 204. The second seals 233 may include a compliant material, such as felt or mica. The second seals 233 may also include felt or mica in combination with a glassy material. In other embodiments, the second seals 233 may include a metal gasket. The first and/or second seals 231, 233 may operate to reduce stress applied to fuel cell components during thermal cycling.

Figure 11:
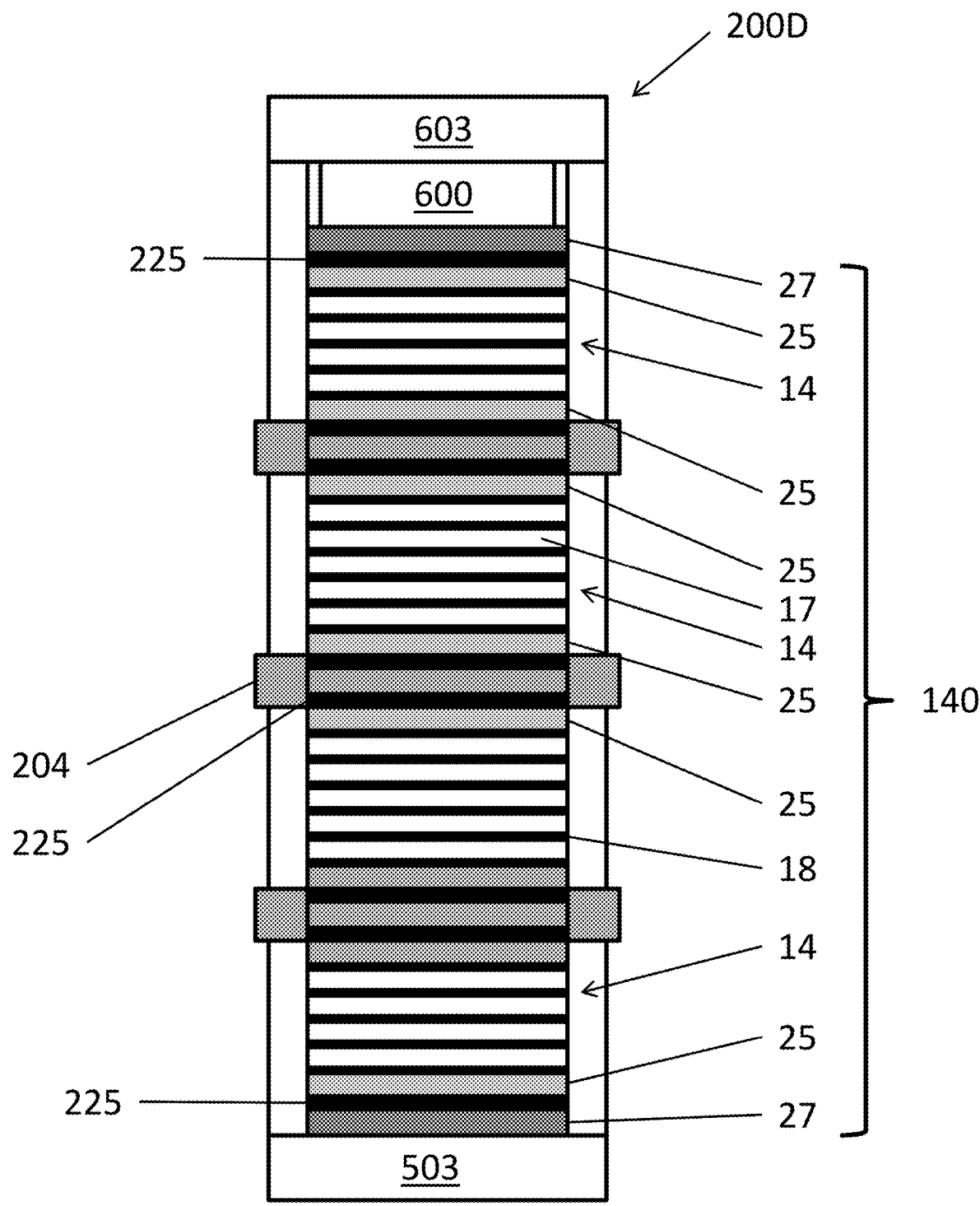
FIG. 11 is a front schematic view of a fuel cell stack assembly, according to various embodiments of the present disclosure.

FIG. 11 is a schematic view of a fuel cell stack assembly 200D, according to various embodiments of the present disclosure. The fuel cell stack assembly 200D is similar to the fuel cell stack assembly 200A, so only the differences therebetween will be discussed in detail.

Referring to FIG. 11, the fuel cell stack assembly 200D includes buffer layers 225 disposed between various components. For example, buffer layers 225 may be disposed between the termination plates 27 and the adjacent end plates 25 of adjacent stacks. In addition, buffer layers 225 may be disposed between the fuel manifolds 204 and adjacent end plates 25. According to some embodiments, one or more of the buffer layers 225 may be omitted.

The buffer layer 225 may be configured to minimize the stress applied to adjacent components of the stack 14. Therefore, in some embodiments, the CTE of the end plate 25 is less than the CTE of buffer layer 225, and the CTE of the buffer layer 220 is less than the CTE of the fuel manifold 204 and/or termination plate 27. In other embodiments, the CTE of the end plate 25 may be higher than the CTE of the buffer layer 225, and the CTE of the buffer layer 225 may be higher than the CTE of the fuel manifold 204 and/or the termination plate 27.

One material suitable for use in the buffer layer 225 is a ferritic stainless steel-aluminum oxide cermet, such as SS446-$Al_2O_3$, which is stable at high temperatures. The CTE of such a material can be tailored depending of the amount of added $Al_2O_3$. SS446 stainless steel may have a composition of 23-27 wt % Cr, 1.5 wt % Mn, 1 wt % Si, 0.25 wt % Ni, less than 1 wt % C, P and S, and balance iron. This cermet material is castable, so plates can be readily and inexpensively produced. Another suitable material may be Inconel 783. The Inconel 783 is an alloy including 26-30 wt % Ni, 24-27 wt. % Fe, 5-6 wt. % Al, 2.5-3.5 wt. % Cr, 2.5-3.5 wt. % Nb, up to 0.50 wt. % Cu, up to 0.50 wt. % Mn, up to 0.50 wt. % Si, up to 0.10-0.40 wt. % Ti, up to 0.03 wt. % C, 0.003-0.012 wt. % B, up to 0.015 wt. % P, up to 0.005 wt. % S, and balance Co. Other electrically conductive cermet or metal alloy materials having a CTE of greater than 9.7 and less than 10.4 ppm/° C. may also be used.

Figure 12:
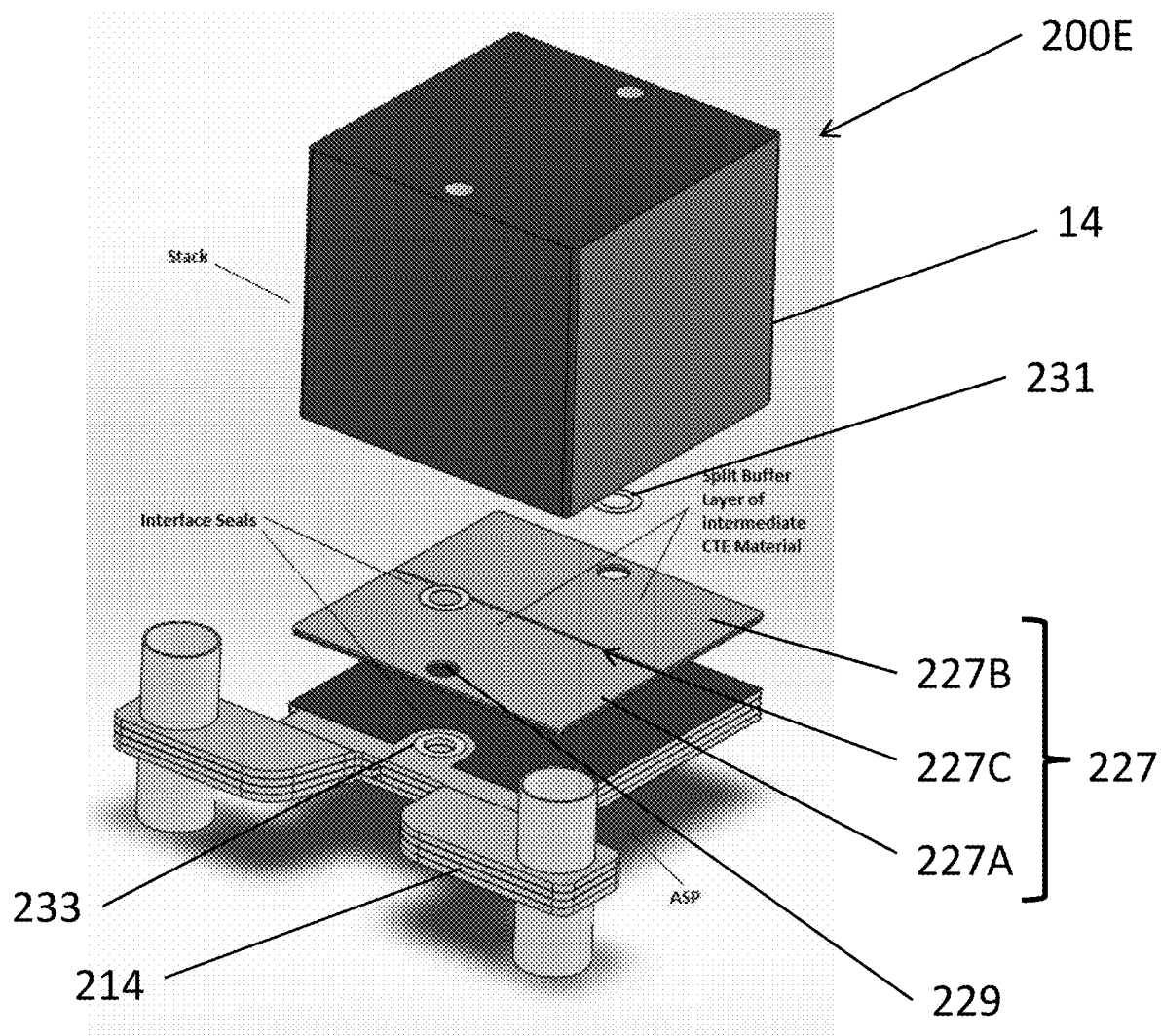
FIG. 12 is an exploded perspective view of a fuel cell stack assembly, according to various embodiments of the present disclosure.

FIG. 12 is an exploded perspective view of a fuel cell stack assembly 200E, according to various embodiments of the present disclosure. The fuel cell stack assembly 200E is similar to the fuel cell stack assembly 200C, so only the differences therebetween will be discussed in detail.

Referring to FIG. 12, the fuel cell stack assembly 200E includes a buffer layer 227 having a segmented configuration. In particular, the buffer layer 227 includes a first piece 227A and a second piece 227B, each including a fuel riser opening 229. According to some embodiments, the first and second pieces 227A, 227B may be separated by an expansion zone 227C. The division of the buffer layer 227 reduces stress applied to fuel cell assembly components resulting from CTE mismatch of fuel cell stack assembly components.

Any one or more features from any one or more embodiments may be used in any suitable combination with any one or more features from one or more of the other embodiments. Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A fuel cell stack column comprising:
   first and second termination plates; and
   at least one fuel cell stack disposed between the first and second termination plates,
   wherein at least one of the first and second termination plates comprises first and second pieces separated by an expansion zone; and
   wherein each of the first and second pieces comprises a fuel riser opening sealing surface.

2. A fuel cell stack column comprising:
   first and second termination plates; and
   at least one fuel cell stack disposed between the first and second termination plates,
   wherein at least one of the first and second termination plates comprises first and second pieces separated by an expansion zone; and
   wherein the first and second the termination plates comprise electrical connectors attached to one of the corresponding first and second pieces.

3. A fuel cell stack column comprising:
   first and second termination plates; and
   at least one fuel cell stack disposed between the first and second termination plates,
   wherein at least one of the first and second termination plates comprises first and second pieces separated by an expansion zone;
   wherein the fuel cell stack column comprises a plurality of the fuel cell stacks and fuel manifolds disposed between the fuel cell stacks, each fuel cell stack comprising:
   fuel cells;
   interconnects disposed between the fuel cells; and
   end plates disposed on opposing sides of the fuel cell stack,
   wherein the coefficient of thermal expansion (CTE) of the fuel cell stack is not equal to the CTE of the termination plates; and
   wherein the fuel manifolds each comprise first and second pieces separated by an expansion zone.

4. The fuel cell stack column of claim 3, further comprising:
   a first buffer layers disposed between the fuel manifolds and an adjacent fuel cell stack; and
   a second buffer layers disposed between the termination plates and the adjacent fuel cell stacks,
   wherein the first and second buffer layers each comprise first and second pieces separated by an expansion zone.

* * * * *